No. 646,497. Patented Apr. 3, 1900.
H. R. LAMB & V. HOXIE.
ART OF CONNECTING WIRES.
(Application filed Nov. 28, 1899.)
(No Model.) 3 Sheets—Sheet 1.
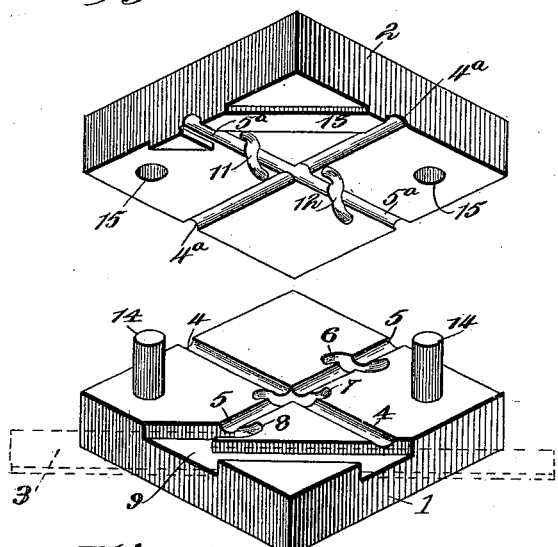
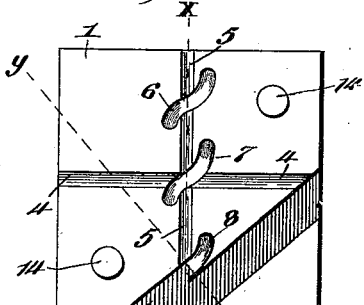
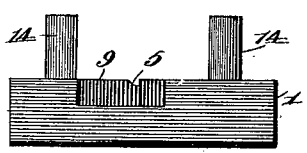
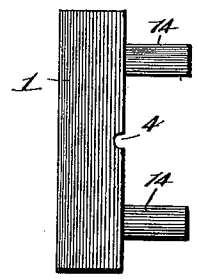
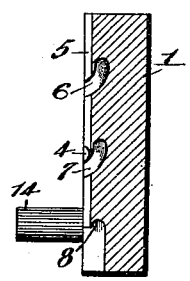
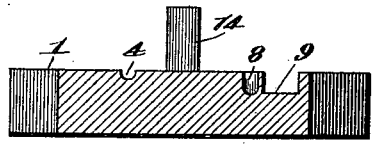
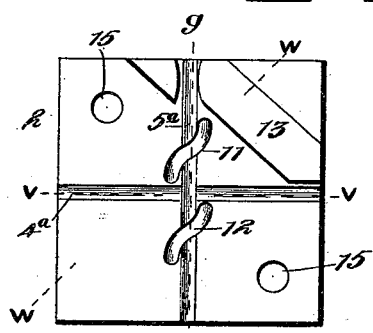
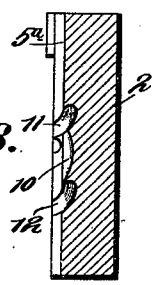
Witnesses
C. H. Walker.
Chas. S. Hoyer.
Hiram R. Lamb,
Vernon Hoxie, Inventors
By their Attorneys,
C. A. Snow & Co.
THE NORRIS PETERS CO., PHOTO-LITHO., WASHINGTON, D. C.

No. 646,497. Patented Apr. 3, 1900.
H. R. LAMB & V. HOXIE.
ART OF CONNECTING WIRES.
(Application filed Nov. 28, 1899.)
(No Model.) 3 Sheets—Sheet 2.
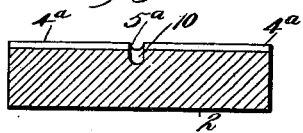
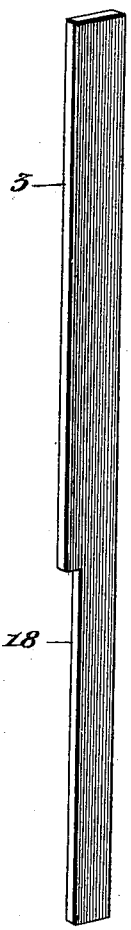
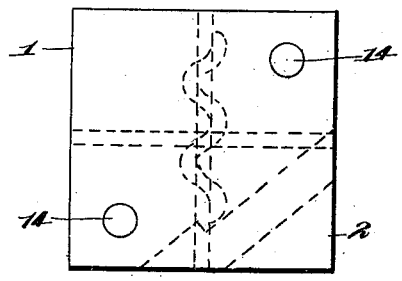
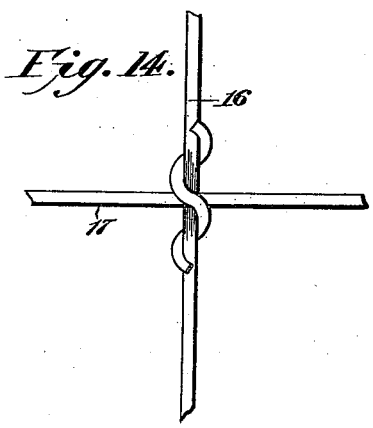
Witnesses
Hiram R. Lamb
Vernon Hoxie
Inventors
By their Attorneys, No. 646,497. Patented Apr. 3, 1900.
H. R. LAMB & V. HOXIE.
ART OF CONNECTING WIRES.
(Application filed Nov. 28, 1899.)

(No Model.) 3 Sheets—Sheet 3.

Witnesses
C. H. Walker
Chas. S. Hoyer

Hiram R. Lamb.
Vernon Hoxie
Inventors

By Their Attorneys,
C. A. Snow & Co.

UNITED STATES PATENT OFFICE.

HIRAM R. LAMB AND VERNON HOXIE, OF ADRIAN, MICHIGAN, ASSIGNORS TO THE LAMB WIRE FENCE COMPANY, OF SAME PLACE.

ART OF CONNECTING WIRES.

SPECIFICATION forming part of Letters Patent No. 646,497, dated April 3, 1900.

Application filed November 28, 1899. Serial No. 738,621. (No specimens.)

*To all whom it may concern:*

Be it known that we, HIRAM R. LAMB and VERNON HOXIE, citizens of the United States, residing at Adrian, in the county of Lenawee and State of Michigan, have invented a new and useful Art or Manufacture of Wire Fabrics, of which the following is a specification.

This invention relates to the art or manufacture of wire fabrics embodying a series of wires extending in one direction and to which other wires are arranged at an angle at predetermined intervals, and particularly to the formation of intersecting crimps and the application of ties, which is accomplished in part by extraneous preparation, the feed and pressure of a plunger, and coinciding dies of a particular character.

The principal object sought and materialized is the feeding of predetermined lengths of tie-wire without any positive shape to dies holding other wires arranged at an angle in correlative position and crimped therebetween and by continued pressure cause said lengths to move over and around portions of the wires they are to connect and produce a firm joint.

Figure 15:
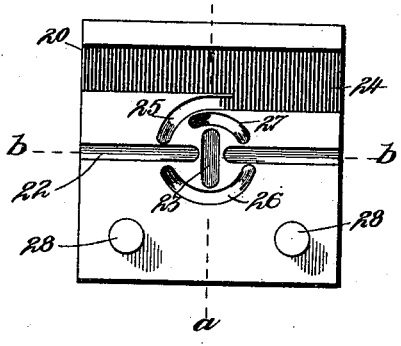
Figures 16, 18:
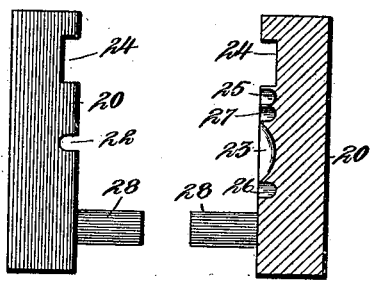
Figure 17:
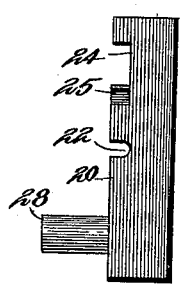
Figures 19, 24:
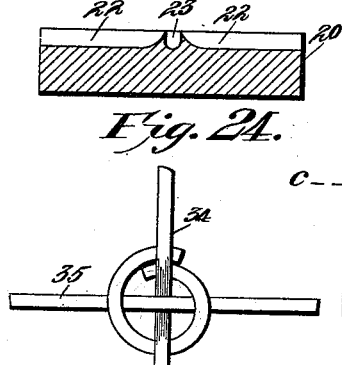
Figure 20:
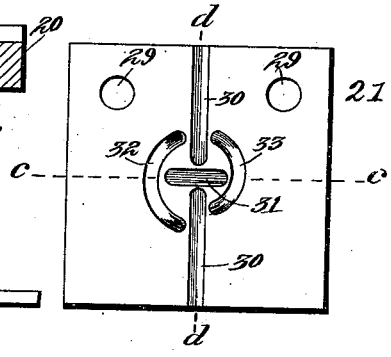
Figure 21:
Figures 22, 23:
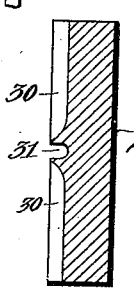
Figure 25:
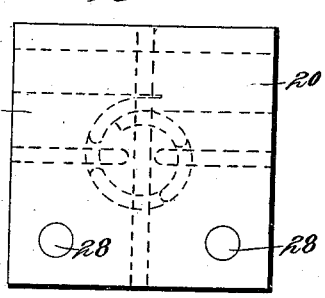

In the drawings, Figure 1 is a perspective view of dies, showing in dotted lines a plunger in working relation thereto and all embodying the features of the invention. Fig. 2 is a plan view of the prime die. Fig. 3 is an end elevation of the same. Fig. 4 is an end elevation of the adjacent end of the die.
Fig. 5 is a section on the line $xx$, Fig. 2. Fig. 6 is a section on the line $yy$, Fig. 2. Fig. 7 is a top plan view of the companion die. Fig. 8 is a section on the line $gg$ of Fig. 7. Fig. 9 is a section on the line $vv$, Fig. 7. Fig. 10 is a section on the line $ww$, Fig. 7. Fig. 11 is a detail perspective view of the improved plunger. Fig. 12 is a detail view of the tie-wire length in the form in which it is fed into the dies. Fig. 13 is a diagrammatic view of the working faces of the dies, showing the relative position of the grooves when said faces are in coincidence. Fig. 14 is a top plan view of a portion of cross-wires connected by the tie as arranged by the dies. Fig. 15 is a top plan view of another form of prime die. Fig. 16 is a left end elevation of the die shown by Fig. 15. Fig. 17 is a right end elevation of the die shown by Fig. 15. Fig. 18 is a section on the line $aa$, Fig. 15. Fig. 19 is a section on the line $bb$, Fig. 15. Fig. 20 is a top plan view of a companion die for that shown by Fig. 15. Fig. 21 is an end elevation of the die shown by Fig. 20. Fig. 22 is a cross-section through the center of the die shown by Fig. 20 and on the line $cc$. Fig. 23 is a cross-section through the die shown by Fig. 20 on the line $dd$. Fig. 24 is a top plan view of portions of cross-wires and a tie-wire thereon as arranged by the dies shown by Figs. 15 and 20. Fig. 25 is a diagrammatic view of the working faces of the dies shown by Figs. 15 and 20 and illustrating the position of the grooves therein.

Similar numerals of reference are employed to indicate corresponding parts in the several views.

The coacting dies, as shown by Figs. 1 to 10, inclusive, are designated by the numerals 1 and 2 and are adapted to be mounted in a machine for movement toward and from each other simultaneously, or substantially so. The operation of these dies is not dependent on any particular form of machine, and conjointly coacting therewith is a plunger 3, having a particular construction and operable by any suitable mechanism.

The die 1 or prime die is provided with concaved or semicircular seat-grooves 4 and 5, running across its face through its center at angles to each other, and extending diagonally across and deeper than the groove 5 are two tie-wire grooves 6 and 7, and also a half-diagonal tie-wire groove 8 is formed adjacent a part of the said groove 5. Extending diagonally across one corner of the said die 1 is a channel 9, which is deeper than the groove 5, to a degree equal to the thickness of the plunger and into which the outer part of the half-groove 8 merges, and from thence extends at an angle to the plane of the working face of the die. The grooves 6 and 7 are deeper than the groove 5 to an extent equal to the size of the tie-wire, and the channel 9 is wider at the end adjacent the half-groove 8 to receive the tie-wire and plunger together in a manner which will be more fully hereinafter explained.

The die 2 has seat-grooves $4^a$ and $5^a$ therein, which are similar to the grooves 4 and 5 in the die 1, except that the groove $5^a$ is deeper at the center, as shown at 10, Figs. 8 and 9. The groove $5^a$ of the die 2 has tie-grooves 11 and 12 across the same, which are similar to the grooves 6 and 7 in the die 1, but differently located for disposition over adjacent points intermediate of the grooves 6, 7, and 8 when the working faces of the dies coincide. Extending diagonally across one corner of the die 2 is a flat rib 13, intersected by the outer extremity of the groove $5^a$ at this point and adapted to be fitted in the channel 9 to take up the difference of the depth of said channel relatively to the several grooves and maintain the plunger 3 in close working position to effectively insert the tie-wire.

The die 1 is provided with dowel-pins 14, and the companion die 2 has holes 15 therein to receive the said dowel-pins when the dies are brought face to face, and in this arrangement the rib 13 will coincide with and partially fill the channel 9, as before indicated. When the dies come together, the grooves 4 and 5 coincide or register with the grooves $4^a$ and $5^a$, respectively, in the dies 1 and 2, as clearly shown in Fig. 13, the inner terminal of the half-groove 8 being adjacent the outer terminal of the tie-groove 11, and the opposite terminal of the latter is disposed in operative relation to the terminal of the groove 7 nearest the groove 8. The inner terminal of the groove 12 at this time is over or adjacent to the terminal of the groove 7 nearest the groove 6, and the outer terminal of said groove 12 will stand close to the inner terminal of the groove 6. From this arrangement it will be observed that the tie-wire grooves are disposed in alternation partially in each die-face in the direction of the grooves 5 and $5^a$. By this means also a lead or guide for the entering end of the tie-wire is provided over opposite portions of the angularly-disposed cross-wires. Presuming that the cross-wires 16 and 17, as shown by Fig. 14, are held between the dies with the wire 16 lying next to the prime die or die 1 and the wires 17 next to the companion die 2, and so that said wires will lie half and half, respectively, in the seat-grooves 4 and 5 and $4^a$ and $5^a$, with the central part of the wire 16 entirely in the deeper portion 10 of the groove $5^a$ at the center, the pressure of the dies will crimp the cross-wires at the center and also hold them firmly against movement and in condition for the reception of the tie-wires. The plunger 3 is next brought into operative position relative to the mouth of the channel 9 and moves diagonally of the dies, one end having a side recess or seat 18 of a depth equal to the thickness of the length of the wire 19, which is inserted in said recess and moved endwise by the plunger 3, through the half-groove 8, over the adjacent portion of the wire 16, and then through the groove 11, around said wire, and through the groove 7, over the point of intersection of the cross-wires and the crimp-joint, and again around the wire 16, through the groove 12, and finally through the groove 6, over the said latter wire. When this operation shall have been completed, the tie will be wrapped around the cross-wires in elongated spiral form and bear upon a greater extent of the wire 16 than the wire 17 and constitute a firm lock or jointure of the said cross-wires.

A different form of the die is shown by Figs. 15 to 23, inclusive, in which substantially the same operation is pursued as in the preceding form and wherein the tie-wire is given a slightly-different spiral contour when applied. The dies 20 and 21 are intended to be somewhat similar in construction to the two dies 1 and 2 heretofore described, and extending centrally across the face of the die 20 is a seat-groove 22, intersected by a transversely-arranged central channel 23, the opposite inner terminals of the interrupted groove 22 being gradually inclined toward the side marginal edges of the said channel 23.

Extending across the die 20, parallel with one side edge, is a plunger-channel 24, which is widened at one extremity a distance equal to the thickness or gage of the tie-wire and into which merges the outer portion of a tie-wire groove 25, extending inwardly close to the part of the seat-groove to the left of the center of the die. The inner terminal of the said groove 25 also inclines toward the adjacent groove 22, and on the opposite side of the latter and outside of the adjacent end of the central channel 23 a distinct segmentally-curved tie-wire groove 26 is located, which has both its terminals slanted in the direction of the opposite parts of said seat-groove 22 and is closer to the center of the die than the groove 25. Around the opposite terminal of the channel 23 and between the latter and the groove 25 and the adjacent marginal wall of the channel 24 a shorter segmental tie-wire groove 27 is formed and is closer to the center of the die than the groove 26. The terminal of the groove 27 nearest the right-hand part of the seat-groove 22 inclines outwardly, and the opposite terminal of said groove is of such shape as to seat the inner end of the threaded tie-wire when the operation of applying said tie-wire has been completed.

The die 20 has dowel-pins or analogous devices 28 projecting therefrom and adapted to interlock or coincide with openings 29, formed in the companion die 21. This latter die is also provided with a seat-groove 30, arranged at an angle to the groove 22 of the die 20 and interrupted at the center by a short channel 31, extending in a plane at an angle thereto and also to the channel 23 of the die 20. Around opposite extremities of the channel 31 are segmental tie-wire grooves 32 and 33, struck from different centers, the groove 33 being shorter than the groove 32 and the terminals of both grooves leading toward the adjacent longitudinal marginal edges of the groove 30. Both of the channels 23 and 31 have considerable concaved depth, as shown by Figs. 18 and 22, thus giving a gradual outward inclination to the opposite terminals thereof.

When the dies 20 and 21 are brought together in coinciding or working position, the said grooves 22 and 30 are at an angle to each other, in the present instance a right angle. The channels 23 and 31 will be likewise positioned and the several tie-wire grooves will be disposed in continued relation or so that portions of opposite terminals or extremities of each will be respectively over and under similar parts of the others. This is clearly shown in Fig. 25, and to closely follow the correlative position and to determine their operative continuity for the purpose of alternately feeding the tie-wire above and below opposite portions of the cross-wires it will be observed that the one extremity of the tie-wire groove 32 in the die 21 is brought over a greater portion of the tie-wire groove 25 of the die 20, the said groove 32 extending over the adjacent part of the seat-groove 22 in the die 20 and over the one extremity of the groove 26 in said die 20. The groove 33 of the die 21 also operatively connects the opposite extremity of the groove 26 with the inner portion of the groove 27, thus providing a mold or means for forming what may be termed a "flat spiral," as shown by Fig. 24. When the dies are brought together, the cross-wires 34 and 35, as shown by Fig. 24, will be so positioned that the wire 35 will lie in the seat-groove 22 of the die 20 and the wire 34 in the seat-groove 30 of the die 21, and through the medium of the channels 23 and 31 both wires 34 and 35 will be crimped at the crossing as soon as the working faces of the dies are brought together and said cross wires be firmly held against movement. When the cross-wires 34 and 35 are held between the dies, the wire 35 extends transversely across or over the grooves 32 and 33, and the wire 34 is over and intersects portions of the grooves 26, 27, and 25. A plunger similar to that heretofore described is employed for feeding straight lengths of the tie-wires to the dies 20 and 21, and the tie-wire length is first threaded into the entrance end of the groove 25 under the adjacent part of the wire 34 and following through said groove is directed into groove 32 of die 21 and over the wire 35 and also into the groove 26, again under the wire 34 on the opposite side of the crimped centers of said wires and considered as the wires are positioned in Fig. 24. The said tie-wire is then moved along through the grooves 26, 33, and 27 in alternation until it is again over the wire 35 in approximately the same plane as before, and finally the extremity is drawn over the wire 34 where both extremities of the tie-wire will be located, thus closely joining the crimped portions of the cross-wires and exerting a locking tension thereon sufficient to resist disconnection under ordinary strain or use.

By forming a recess in one side of the plunger 3 an inner abrupt shoulder is provided, as clearly shown, against which the outer extremity of the tie-wire is held during the operation of insertion between the dies in either form. It will be seen also that the tie-wires are inserted in both instances in the plane of the support of the cross-wires, which will reduce the resistance of practically applying the tie-wires to the cross-wires to a minimum. When the tie-wires have been completely fed into the dies and threaded over the cross-wires, the parts of the tie-wire will closely bear against the traversed portions of the cross-wires and produce a firm lock without making a material surface projection, and when the plunger is fully inserted the tie-wire that has been fed into the dies therewith will have reached its full tie position relatively to the cross-wires and be disposed regularly against opposite points of the latter. The tie-wire will always be fed into the dies in accurate position or alinement to the tie-wire groove into which it is initially fed by reason of the fact that the recess 18 in one side or free extremity of the plunger is just deep enough to cause the tie-wire to lie flush with the adjacent edge of the body of the plunger, and the narrow extremity of the latter, which is formed by the said recess, snugly fits the channel therefor in either instance and precisely directs the inner end of the tie-wire into the first tie-wire groove, which merges into said channel. The tie-wire as fed inwardly into the dies will also be prevented from bending by being held closely between the wall of the widened portion of each channel and the edge of the plunger forming the wall of the recess, and though the tie-wire is longer than the distance between the entrance end of the channel for the plunger and the mouth of the initial tie-wire groove the retention of said tie-wire between the plunger end wall of the widened portion of the channel for the latter will insure a straight feed of said tie-wire. Furthermore, it will be observed in the diagrammatic views that the semispiral grooves in each of the forms of coinciding dies illustrated extend over portions of each other when the die-faces are brought together in working position to serve as leading means for the inwardly-fed tie-wire and prevent retardation of the same or an obstruction to a free bend to guard against a jam or the least interruption to a steady inward movement of the plunger. These overextending portions of the several tie-wire grooves in alternation in the opposite die-faces will be located adjacent the points of traverse through the dies of the cross-wires and facilitate the disposition of the tie-wires around opposite portions of the lengths of said cross-wires adjacent their point of intersection. These advantages are particularly important in view of the primal condition of the tie-wires when fed into the dies and are effectively conducive to the attainment of the desired result.

For the particular operation of the dies it is immaterial as to the position of their faces, provided the said faces are closely and gradually brought together and may be arranged either horizontally, vertically, or obliquely, and in accordance with the operating mechanism one or more of the sets of dies can be used in a machine and the angle of the cross-wires can also be varied without materially modifying the several grooves, and, as far as they embody structural features for feeding and receiving a straight tie-wire length proportioned to the several tie-wire grooves. The direction of movement of the tie-wires around the cross-wires is not essential and may be reversed and correspond with the position of the die, and though in the foregoing description a particular movement over and under or around has been explained for the purpose of practically disclosing the invention yet it is not to be understood that the precise position of the parts is necessary. The tie-wires will be cut into necessary lengths and held in convenient position for rapid individual feed, and the gage of the said tie-wires will correspond relatively to that of the cross-wires.

From the preceding disclosure it will be seen that the dies are constructed for the simultaneous feeding and proper positioning of straight lengths of the wires, which after the dies are closed or brought together are bent or twisted around the cross-wires on opposite sides of the intersection thereof by means of a plunger exerting a pressure longitudinally thereof, thus providing for the union of cross-wires disposed at any angle.

Changes may be made in the form of some of the parts, while their essential features are retained and the spirit of the invention embodied. Hence it is not desired to limit the invention to the precise form of all the parts as shown, reserving the right to vary therefrom.

In our pending applications, Serial Nos. 728,479 and 728,480, both filed August 25, 1899, the description and claims allowed relate to guides having a particular mechanical structure and provided with plungers movable thereinto in each instance in the plane of the working faces of the guides, and the broad and specific use of particular spiral formers to which lengths of tie-wire are fed irrespective of the shape of the former in one application and to a special former in the other application, and in this application embodying the art of connecting wires we make no claim to the mechanical features set forth in the before-mentioned applications.

Having thus described the invention, what is claimed as new is—

1. The art of connecting wires consisting of holding the same at an angle to each other and spirally threading a primarily-straight length of tie-wire around the said angularly-disposed wires by a pressure exerted on one end of said tie-wire.

2. The art of connecting wires which consists in holding the same at an angle to each other, holding a tie-wire with one end in advance of the other, and spirally threading the tie-wire around the angularly-disposed wires.

3. The art of applying a tie-wire to crossed wires which consists in holding the crossed wires, holding the tie-wire with one end in advance of the other, and spirally threading the tie-wire around the crossed wires by movement parallel with the tie-wire.

In testimony that we claim the foregoing as our own we have hereto affixed our signatures in the presence of two witnesses.

HIRAM R. LAMB.
    VERNON HOXIE.

Witnesses:
 SETH BEAN,
 EARL C. MICHENER.